US009782881B2

(12) United States Patent
Wolf et al.

(10) Patent No.: US 9,782,881 B2
(45) Date of Patent: Oct. 10, 2017

(54) DEVICE FOR TRANSMITTING ENERGY TO A FASTENER

(75) Inventors: Iwan Wolf, Untervaz (CH); Mario Zahner, Chur (CH); Rolf Erhardt, Buchs (CH)

(73) Assignee: HILTI AKTIENGESELLSCHAFT, Schaan (LI)

( * ) Notice: Subject to any disclaimer, the term of this patent is extended or adjusted under 35 U.S.C. 154(b) by 778 days.

(21) Appl. No.: 12/884,260

(22) Filed: Sep. 17, 2010

(65) Prior Publication Data

US 2011/0101064 A1 May 5, 2011

(30) Foreign Application Priority Data

Sep. 18, 2009 (DE) ........................ 10 2009 041 828

(51) Int. Cl.
*B23B 45/16* (2006.01)
*B25D 9/00* (2006.01)
*B25D 11/00* (2006.01)
*B25D 13/00* (2006.01)
*B25D 16/00* (2006.01)
*E21B 1/00* (2006.01)
*B25C 1/08* (2006.01)

(52) U.S. Cl.
CPC ...................................... *B25C 1/08* (2013.01)

(58) Field of Classification Search
CPC ........................................................ B25C 1/08
USPC ........ 227/2, 8–10, 130; 173/162.2, 104–108, 173/200–201, 217–218
See application file for complete search history.

(56) References Cited

U.S. PATENT DOCUMENTS

| | | | | |
|---|---|---|---|---|
| 1,727,718 | A * | 9/1929 | Kinsey | 60/695 |
| 2,139,457 | A | 12/1938 | Patchett | |
| 3,628,631 | A * | 12/1971 | O'Leary | 184/55.2 |
| 4,483,474 | A * | 11/1984 | Nikolich | 227/8 |
| 4,534,500 | A * | 8/1985 | Jochum | 227/7 |
| 4,773,581 | A * | 9/1988 | Ohtsu et al. | 227/10 |
| 5,115,944 | A * | 5/1992 | Nikolich | 222/94 |
| 5,133,329 | A * | 7/1992 | Rodseth et al. | 123/630 |
| 5,211,558 | A * | 5/1993 | Bailey et al. | 433/77 |
| 5,261,447 | A * | 11/1993 | Boticki | 137/493.2 |
| 5,263,439 | A * | 11/1993 | Doherty et al. | 123/46 SC |

(Continued)

FOREIGN PATENT DOCUMENTS

| | | | |
|---|---|---|---|
| DE | 10244250 | A1 | 3/2004 |
| DE | 10260704 | A1 | 7/2004 |
| DE | 10 2007 000373 | A1 | 1/2009 |

OTHER PUBLICATIONS

Search Report DE Application No. 10-2009 041 828.8 mailed Sep. 23, 2011.

(Continued)

*Primary Examiner* — Robert Long
(74) *Attorney, Agent, or Firm* — Leydig Voit & Mayer

(57) ABSTRACT

The invention relates to a device for transmitting energy to a fastener, with a reaction chamber, an energy-transmission element that can move in a fastening direction for transmitting energy released in the reaction chamber to a fastener, a first supply channel opening into the reaction chamber for feeding a first reagent to the reaction chamber, wherein the first supply channel comprises a feeder device for feeding the first reagent into the reaction chamber and a controllable closing device for a time-wise closing of the first supply channel.

19 Claims, 3 Drawing Sheets

(56) References Cited

U.S. PATENT DOCUMENTS

Figure 1:
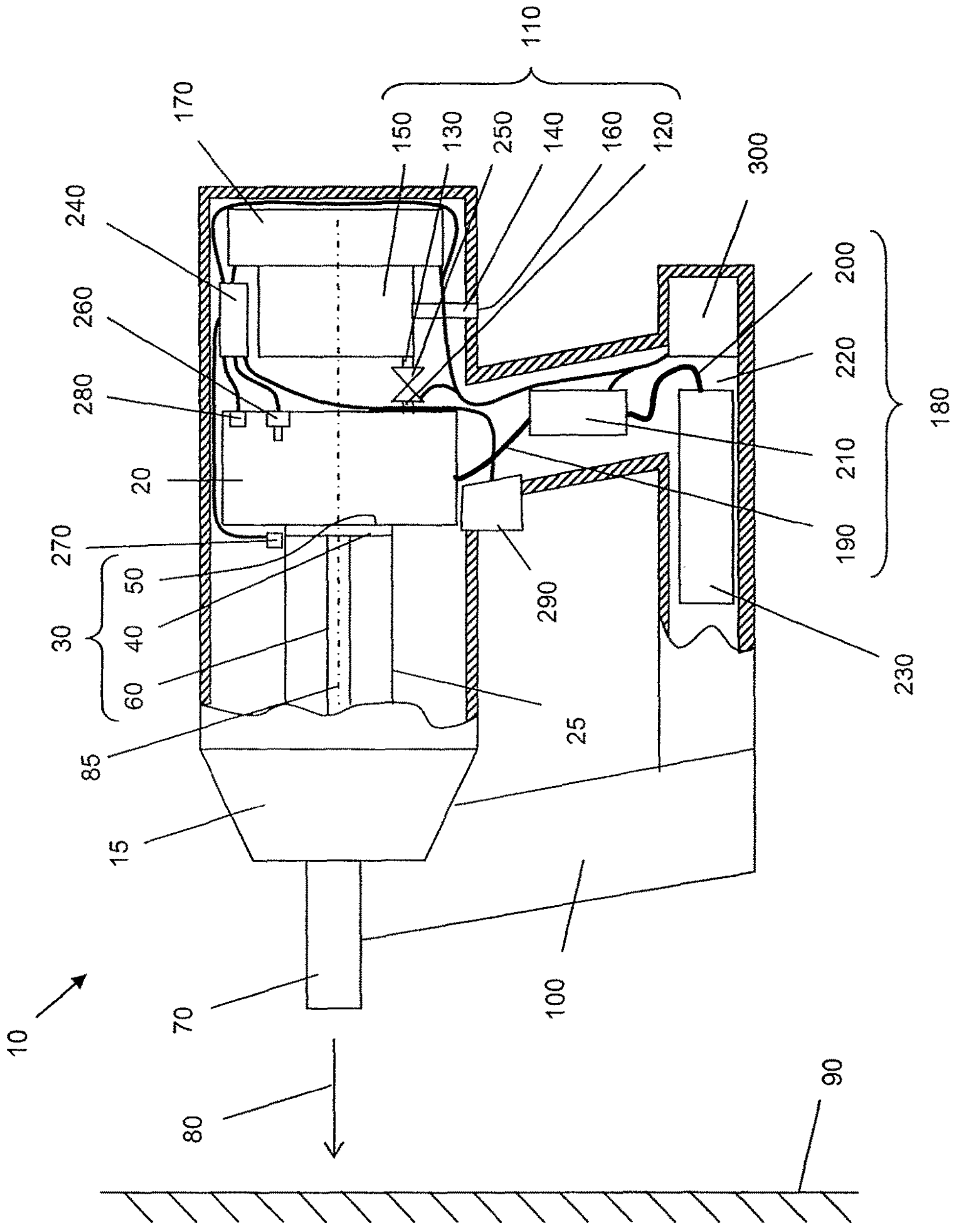

| | | | | |
|---|---|---|---|---|
| 5,377,578 | A * | 1/1995 | Borries | 91/47 |
| 5,660,238 | A * | 8/1997 | Earl et al. | 175/40 |
| 5,873,508 | A * | 2/1999 | MacVicar et al. | 227/10 |
| 5,971,245 | A * | 10/1999 | Robinson | 227/10 |
| 6,311,887 | B1 * | 11/2001 | Walter | 227/10 |
| 6,318,615 | B1 * | 11/2001 | Walter | 227/10 |
| 6,446,726 | B1 * | 9/2002 | Grundmann | 166/288 |
| 6,463,894 | B2 * | 10/2002 | Hasler et al. | 123/46 R |
| 6,520,397 | B1 * | 2/2003 | Moeller | 227/130 |
| 6,783,045 | B2 * | 8/2004 | Shima et al. | 227/8 |
| 6,889,885 | B2 * | 5/2005 | Ohmori | 227/10 |
| 7,063,052 | B2 * | 6/2006 | Nishikawa et al. | 123/46 SC |
| 7,152,584 | B2 | 12/2006 | Odoni et al. | |
| 7,424,870 | B2 * | 9/2008 | Odoni et al. | 123/46 SC |
| 7,444,963 | B2 * | 11/2008 | Tanaka | 123/46 SC |
| 7,484,648 | B2 * | 2/2009 | Gschwend et al. | 227/10 |
| 7,588,096 | B2 * | 9/2009 | Panasik | 173/108 |
| 7,705,482 | B2 * | 4/2010 | Leininger | 290/55 |
| 7,712,547 | B2 * | 5/2010 | Ikuta et al. | 173/162.1 |
| 7,743,955 | B2 * | 6/2010 | Nishikawa et al. | 227/9 |
| 7,775,040 | B2 * | 8/2010 | Khalil | 60/419 |
| 7,918,373 | B2 * | 4/2011 | Ohmori | 227/8 |
| 7,967,177 | B2 * | 6/2011 | Sperrfechter et al. | 227/10 |
| 7,980,440 | B2 * | 7/2011 | Hahn et al. | 227/10 |
| 8,205,777 | B2 * | 6/2012 | Nishikawa et al. | 227/10 |
| 8,215,528 | B2 * | 7/2012 | Matsunaga et al. | 227/8 |
| 8,302,832 | B2 * | 11/2012 | Porth et al. | 227/120 |
| 2004/0026476 | A1 * | 2/2004 | Shima et al. | 227/10 |
| 2004/0134961 | A1 * | 7/2004 | Wolf | B25C 1/08<br>227/10 |
| 2004/0182907 | A1 * | 9/2004 | Dittrich | 227/10 |
| 2005/0001002 | A1 * | 1/2005 | Schiestl et al. | 227/10 |
| 2006/0032886 | A1 * | 2/2006 | Gschwend et al. | 227/10 |
| 2006/0225675 | A1 * | 10/2006 | Nishikawa et al. | 123/46 H |
| 2007/0074684 | A1 | 4/2007 | Odoni et al. | |
| 2007/0210132 | A1 * | 9/2007 | Akiba | 227/10 |
| 2008/0156842 | A1 * | 7/2008 | Panasik | 227/8 |
| 2008/0190988 | A1 * | 8/2008 | Pedicini et al. | 227/130 |
| 2009/0000801 | A1 * | 1/2009 | Calvet et al. | 173/210 |
| 2009/0014494 | A1 | 1/2009 | Dittrich | |
| 2009/0250499 | A1 * | 10/2009 | Hahn et al. | 227/10 |
| 2010/0102103 | A1 * | 4/2010 | Heeb et al. | 227/9 |
| 2012/0018485 | A1 * | 1/2012 | Osuga et al. | 227/9 |
| 2016/0144496 | A1 * | 5/2016 | Raggl | B25C 1/08<br>29/432 |

OTHER PUBLICATIONS

Search Report, German Application No. 10 2009 041 824.5 mailed Sep. 22, 2011.

* cited by examiner

DEVICE FOR TRANSMITTING ENERGY TO A FASTENER

FIELD OF THE TECHNOLOGY

The invention relates to a device for transmitting energy to a fastener.

PRIOR ART

Such devices typically comprise a reaction chamber in which one or more reagents react with each other and an energy-transmission element that transmits at least a part of the energy released during the reaction in the reaction chamber to a fastener.

After the fastener is fastened to a backing, it is desirable that the device is available for a new transmission of energy to a fastener after the shortest possible time.

PRESENTATION OF THE INVENTION

The task of the invention is to disclose a device for transmitting energy to a fastener in which the reaction chamber can be supplied with at least one first reagent in a short time.

The task is achieved by a device for transmitting energy to a fastener with a reaction chamber, an energy-transmission element that can be moved in a fastening direction for transmitting energy released in the reaction chamber to a fastener, a first supply channel opening into the reaction chamber for feeding a first reagent to the reaction chamber, wherein the first supply channel comprises a feeder device for feeding the first reagent into the reaction chamber and a closing device for a time-wise closing of the first supply channel, and a control device connected to the closing device for opening and closing the closing device according to specified conditions.

By controlling the supply to the reaction chamber with the first reagent by means of opening and closing the closing device, a uniform supply is made possible, especially in the case of a continuously operated feeder device.

One preferred embodiment is characterized in that the reaction chamber has an especially preferred initialization device arranged in the reaction chamber for the initialization of a reaction, wherein the initialization device is connected to the control device. In an especially preferred way, the control device comprises a control mechanism that triggers the initialization of a reaction in the reaction chamber by means of the initialization device under the condition that the closing device is closed.

One preferred embodiment comprises position-determination means for determining the position of the energy-transmission element, wherein the position-determination means are connected to the control device and wherein the control device comprises a control mechanism that triggers the opening of the closing device or the initialization of a reaction in the reaction chamber by means of the initialization device under the condition that the energy-transmission element is positioned in a starting position.

One preferred embodiment comprises state-determination means for determining a state variable in the reaction chamber, wherein the state-determination means are connected to the control device. In an especially preferred way, the control device comprises a control mechanism that triggers an opening or closing of the closing device or the initialization of a reaction in the reaction chamber by means of the initialization device under the condition that a state variable in the reaction chamber reaches or exceeds or falls below a specified value.

One preferred embodiment comprises a drive device for the feeder device, wherein the control device is connected to the drive device for controlling the feeder device.

One preferred embodiment is characterized in that the feeder and/or drive device is connected to the control device. In an especially preferred way, the control device comprises a control mechanism that triggers the opening of the closing device under the condition that the feeder device is in operation.

One preferred embodiment is characterized in that the feeder and/or drive device is connected to the control device, wherein the control device comprises a control mechanism that triggers an interruption of the feeder or drive device under the condition that the feeder device has been operating for a specified duration.

One preferred embodiment is characterized in that the closing device is arranged downstream of the feeder device and upstream of the reaction chamber.

One preferred embodiment comprises a second supply channel for feeding a second reagent to the reaction chamber. In an especially preferred way, the second supply channel opens into the first supply channel upstream of the closing device viewed in the direction of flow of the first reagent. According to another especially preferred embodiment, the second supply channel opens into the first supply channel downstream of the closing device viewed in the direction of flow of the first reagent.

One preferred embodiment is characterized in that the first supply channel and/or the second supply channel has an inlet opening for surrounding air.

One preferred embodiment comprises a receptacle for a reagent reservoir adjacent to the first supply channel and/or to the second supply channel.

One preferred embodiment is characterized in that the feeder device comprises a rotor having a rotational axis and a feeder element arranged locked in rotation on the rotor for feeding the first reagent.

One preferred embodiment of the device comprises a piston guide, wherein the energy-transmission element comprises a piston guided in the piston guide in the fastening direction and having, in particular, a piston axis of symmetry oriented in the fastening direction with an energy-receiving face adjacent to the reaction chamber and a hammer with an energy-discharge face.

One preferred embodiment of the device comprises a rotary drive having a rotational axis for the rotor.

One preferred embodiment of the device is characterized in that the rotational axis of the rotor and/or the rotational axis of the drive is oriented essentially in the fastening direction and coincides, in particular, essentially with the piston axis of symmetry.

According to one preferred embodiment, the second supply channel opens into the first supply channel. In an especially preferred way, the second supply channel opens into the first supply channel upstream of the feeder device viewed in the direction of flow of the first reagent. According to another preferred embodiment, the second supply channel opens into the feeder device. According to another preferred embodiment, the second supply channel opens into the first supply channel downstream of the feeder device viewed in the direction of flow of the first reagent.

One preferred embodiment of the device is characterized in that the feeder element is arranged on the rotor so that it can move in the radial direction.

EMBODIMENTS

Figure 2:
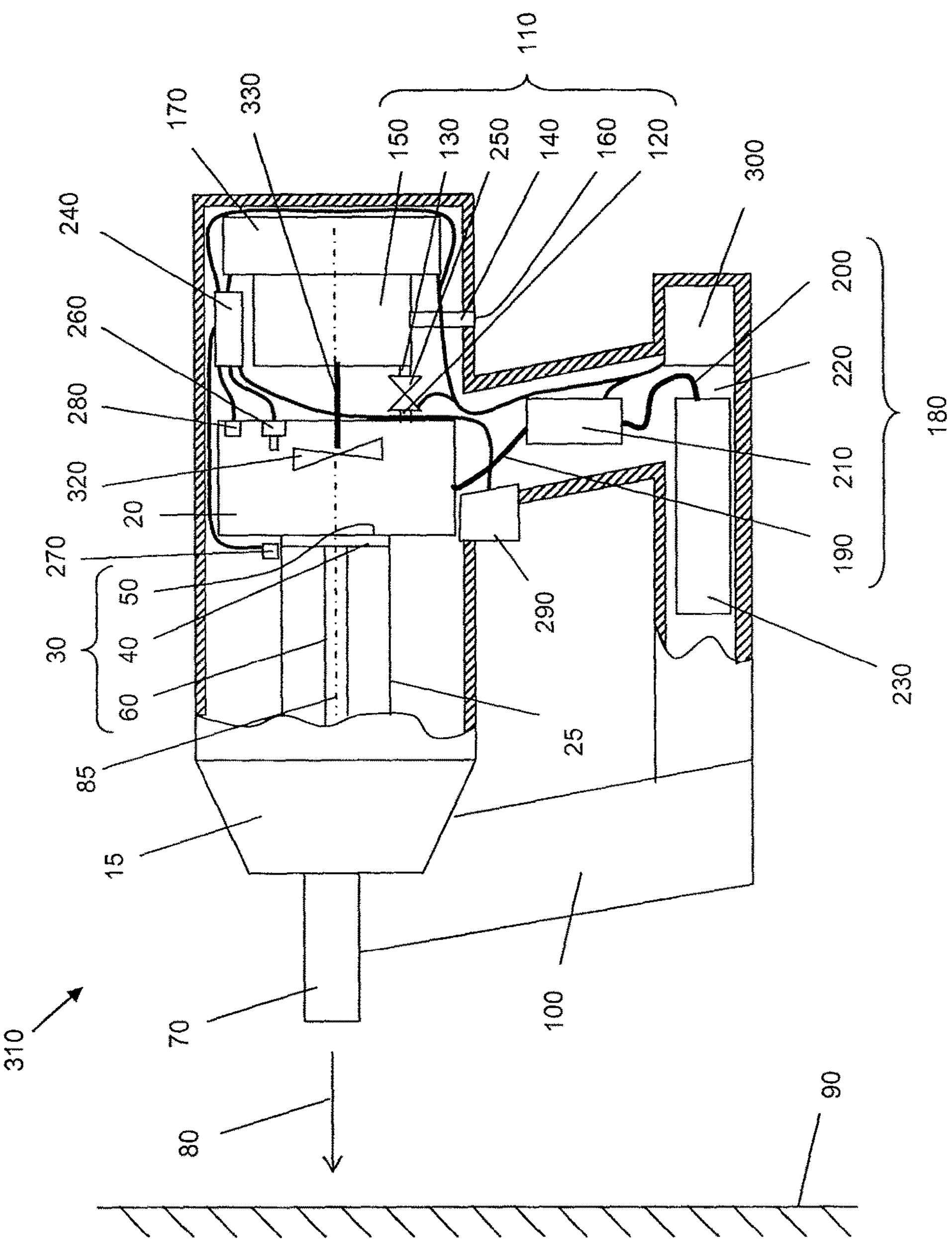

The invention is explained in detail below using embodiments with reference to the drawings. Shown are:

FIG. 1, schematically, a device for transmitting energy to a fastener,

FIG. 2, schematically, a device for transmitting energy to a fastener, and

Figure 3:
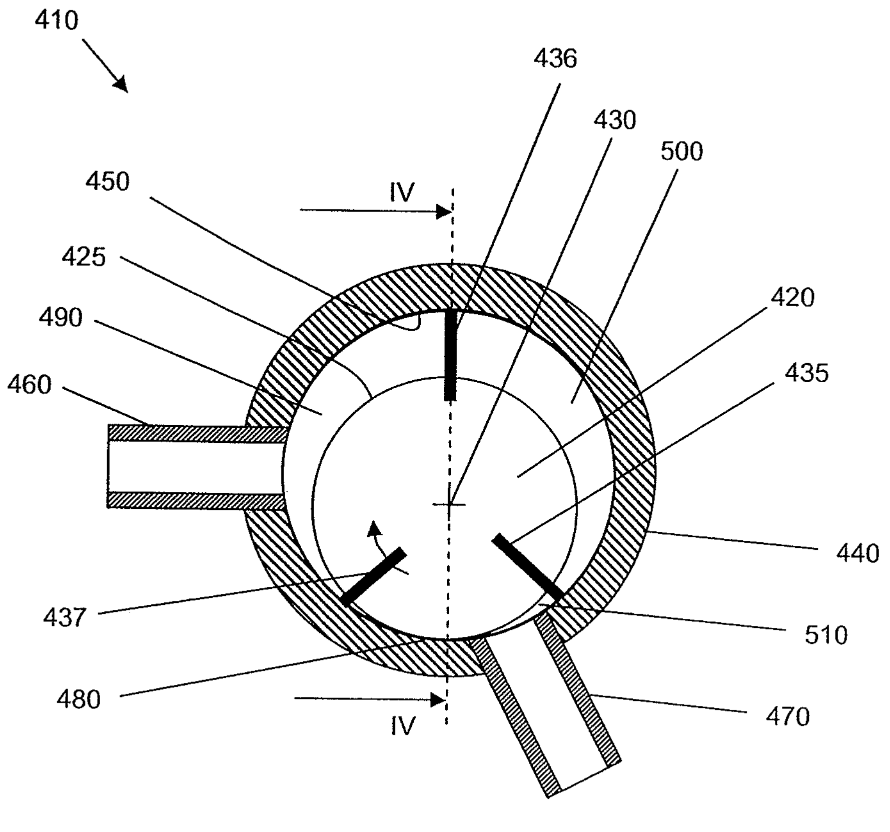

FIG. 3, a cross section of a feeder device.

In FIG. 1, a device 10 for transmitting energy to a fastener, for example, a nail, pin, bolt, or the like, is shown schematically. Advantageously, kinetic energy is transmitted to the fastener; in the case of not-shown embodiments, additionally or alternatively a different energy form is transmitted, for example, rotational energy, especially in the case of a screw or the like as the fastener.

The device 10 has a housing 15 and, in the housing, a reaction chamber 20 with a preferably cylindrical expansion chamber 25 as well as energy-transmission means comprising an energy-transmission element 30. The energy-transmission element 30 is constructed as a piston in the shown embodiment and comprises a piston plate 40 with an energy-receiving face 50 for receiving the energy released in the reaction chamber 20. The energy-transmission element 30 further comprises a piston rod 60 with a not-shown energy-discharge face for the discharge of energy to a not-shown fastener. The piston plate 40 and the piston rod 60 are connected to each other, in particular, rigidly. The energy-discharge face is here arranged advantageously on a side of the energy-transmission element facing away from the energy-receiving face.

On and/or in the housing 15, the device 10 has guide means for guiding the energy-transmission element 30 in a fastening direction 80, wherein the energy-transmission element 30 can be moved in the fastening direction 80 and has, in particular, an axis of symmetry 85 oriented in the fastening direction. The guide means comprise a guide element 70 that is constructed, in particular, as a piston guide and is used as a guide of the piston rod 60. Preferably, the piston plate 40 is guided in the expansion chamber likewise in the fastening direction 80.

In the case of a not-shown embodiment, the energy-transmission element is constructed as a hammer or the like. In the case of other not-shown embodiments, the energy-transmission element is not guided in a linear motion, as shown in FIG. 1, but instead supported so that it can rotate about a rotational axis or a rotating point.

For feeding fasteners to the guide element 70 within which the fasteners receive energy from the energy-discharge face of the piston rod 60, in order to be driven into a backing 90, the device 10 has a feeder device 100 constructed, for example, as a magazine. Advantageously, the feeder device 100 here has a not-shown spring element or the like, so that a fastener is held in the guide element 70 by means of spring force.

The device 10 further has a first supply channel 110 opening into the reaction chamber 20 for feeding a first reagent to the reaction chamber 20. The first supply channel 110 comprises, in addition to line sections 120, 130, 140, a feeder device 150 for feeding the first reagent into the reaction chamber 20. Preferably, the feeder device 150 has a not-shown rotor having a rotational axis and a feeder element arranged locked in rotation on the rotor for feeding the first reagent. Preferably, the feeder element is arranged on the rotor so that it can move in the radial direction.

The feeder device 150 preferably has a vane-cell compressor whose vanes form, in particular, one or more feeder elements. According to not-shown embodiments, the feeder device has a screw-type compressor, a screw-spindle pump, a hose pump, a scroll compressor, or a rotary piston pump, in particular, a rotating piston machine, a rotating slide pump, or a gearwheel pump. According to another not-shown embodiment, the feeder device has a blower, in particular, a radial blower or an axial fan, such as, for example, a tube fan. Furthermore, a ram pressure of 50 hPa, especially preferred a ram pressure of 100 hPa could be generated with the feeder device.

The first supply channel 110 has an inlet opening 160 for surrounding air, so that the first reagent is a component of air, especially oxygen. Preferably, the line sections 120, 130, 140 are constructed as tubes or hoses whose material comprises or consists of one or more metals, alloys, ceramics, plastics, and/or elastomers.

The device 10 comprises a rotary drive 170 having a rotational axis for the rotor. Preferably, the rotational axis of the rotor and/or the rotational axis of the drive are oriented essentially in the fastening direction and/or in the direction of an axis of symmetry of the expansion chamber 25, so that mechanical loads of axle bearings and the like due to recoil occurring under some circumstances during a fastening process and/or other acceleration forces, such as, for example, gyrostatic moments, are reduced. Under some circumstances, bearings with low weight and low cost can be used here. In an especially preferred way, the rotational axis of the rotor and/or the rotational axis of the drive essentially coincide with the axis of symmetry 85 of the energy-transmission element 30.

In the case of not-shown embodiments, the feeder device and/or the drive device are supported damped relative to the expansion chamber and/or the reaction chamber or the feeder device is supported damped relative to the drive device. This is implemented, for example, by one or more elastic elements for supporting the feeder device or the drive device. The elastic element or elements have, for this purpose, an elastic material, for example, an elastomer, and/or an elastic shape, for example, a spring, in particular, a coil spring, spiral spring, double-acting torsion bar, flexible spring, disk spring, or leaf spring. In the case of other not-shown embodiments, the elastic element or elements have a volute spring, annular spring, or gas spring.

The device 10 further comprises a second supply channel 180 opening into the reaction chamber 20 for feeding a second reagent to the reaction chamber 20. The second supply channel 180 comprises, in addition to line sections 190, 200, a dosing device 210 for dosing the second reagent into the reaction chamber 20. Preferably, the line sections 190, 200 are constructed as tubes or hoses, whose material comprises or consists of one or more metals, alloys, ceramics, plastics, and/or elastomers.

The device 10 has a receptacle 220 adjacent to the second supply channel 180 for a reagent reservoir 230. The reagent reservoir 230 can be connected here to the second supply channel such that the second reagent can be fed through the second supply channel into the reaction chamber 20. Preferably, the reagent reservoir 230 involves a fuel container, so that the second reagent is a fuel. Preferably, the second reagent is a fluid, in particular, a liquid and/or a gas that is provided, in an especially preferred way at an elevated pressure in the reagent reservoir 230, so that the second reagent can be fed by means of a pressure difference between the reagent reservoir 230 and the reaction chamber 20 through the second supply channel 180. Preferably, the reagent reservoir is constructed as an especially cylindrical nozzle whose material comprises or consists of one or more metals, alloys, ceramics, plastics, and/or elastomers.

According to one not-shown embodiment, the second supply channel opens into the first supply channel. Preferably, the second supply channel opens into the first supply channel upstream of the feeder device viewed in the direction of flow of the first reagent. According to another not-shown embodiment, the second supply channel opens into the feeder device. According to another not-shown embodiment, the second supply channel opens into the first supply channel downstream of the feeder device viewed in the direction of flow of the first reagent.

The first supply channel 110 shown in FIG. 1 comprises a closing device 250 comprising a valve for a time-wise closing of the first supply channel 110. The closing device 250 is here arranged downstream of the feeder device 150 and upstream of the reaction chamber 20 viewed in the direction of flow of the first reagent. The valve preferably involves a check valve.

The valve can be activated advantageously hydraulically, pneumatically, electrically, electromotively, or electromagnetically, in particular, in a directly controlled, servo-controlled, or positive-controlled way. Furthermore, the valve involves, in particular, a disk valve, a roll membrane valve, a squeezing valve, a needle valve, a ball valve, or a tap cock.

The device 10 further comprises a control device 240 for controlling the feeder device 150, the drive device 170, and/or the closing device 250. The control device 240 is connected to the closing device 250 for opening and closing the closing device 250 according to specified conditions. Furthermore, the control device 240 is connected to the drive device 170 for controlling the feeder device 150. The control device 240 advantageously comprises a control mechanism that triggers the opening of the closing device under the condition that the feeder device is in operation. The control device 240 further comprises advantageously a control mechanism that triggers a shutdown of the feeder or drive device under the condition that the feeder device 150 has been operating for a specified duration and/or no more fastening process has taken place for a specified duration. Under some circumstances, energy can be saved in this way. In an especially preferred way, the feeder device 150 remains in operation between shortly following fastening processes, in particular, at a desired rotational speed, so that fastening processes are possible in quick progression, because the feeder device 150 does not have to be started up for each fastening process.

The reaction chamber 20 has an initialization device 260 arranged in the reaction chamber 20 for the initialization of a reaction in the reaction chamber 20, wherein the initialization device 260 is connected to the control device 240. The control device 240 advantageously comprises a control mechanism that triggers the initialization of a reaction in the reaction chamber 20 by means of the initialization device 260 under the condition that the closing device 250 is closed.

The initialization device 260 advantageously comprises an ignition device, such as, for example, a spark plug, by means of which an ignition spark can be generated, in particular, for the ignition of a combustion reaction in the reaction chamber 20.

The device 10 further comprises position-determination means 270 for determining the position of the energy-transmission element 30, wherein the position-determination means 270 are connected to the control device 240. The control device 240 advantageously comprises a control mechanism that triggers the opening of the closing device 250 or the initialization of a reaction in the reaction chamber 20 by means of the initialization device 260 under the condition that the energy-transmission element 30 is positioned in a starting position.

The position-determination means advantageously comprise a sensor, in particular, a motion sensor that detects the position of the energy-transmission element 30 electromagnetically, optically, and/or mechanically. In particular, it is sufficient if the position-determination means detect whether the energy-transmission element 30 is located in a predetermined position. The predetermined position is advantageously a starting position in which the energy-transmission element 30 and thus also the energy-receiving face 50 are arranged as far as possible to the right in FIG. 1, so that the reaction chamber is as small as possible. Advantageously, a reaction in the reaction chamber is initialized when the energy-transmission element 30 is located in the starting position.

The device 10 further comprises state-determination means 280 for determining a state variable in the reaction chamber 20, wherein the state-determination means 280 comprise, for example, a pressure sensor and are connected to the control device 240. The control device 240 advantageously comprises a control mechanism that triggers an opening or closing of the closing device 250 or the initialization of a reaction in the reaction chamber 20 by means of the initialization device 260 under the condition that a state variable in the reaction chamber 20 reaches or exceeds or falls below a specified value. The state variable advantageously involves the pressure, the volume, the mass, the density, and/or the temperature of a gas located in the reaction chamber 20.

Identifying the state variable advantageously reduces variation in a quantity of one or more reagents available for a reaction in the reaction chamber 20 and thus also reduces variation in the energy released during the reaction and thus also transmitted to a fastener. The control device 240 closes the closing device 250 when a predetermined pressure is reached in the reaction chamber 20.

In the case of not-shown embodiments, the control device closes the closing device after a predetermined charge time or after the completion of a predetermined number of rotations of the feeder device and/or the drive device. With reference to the predetermined charge time or number of rotations, a predetermined quantity of one or more reagents is likewise fed into the reaction chamber.

The connection of the control device 240 to the closing device 250, the feeder device 150, the drive device 170, the initialization device 260, the position-determination means 270, and/or the state-determination means 280 advantageously comprises a signal and/or power line, such as, for example, a single-wire or multi-wire cable. The control mechanism or mechanisms comprise, in particular, a program that is stored in the control device 240.

Preferably, the control mechanism or mechanisms produce a sequential control in which the closing device 250 closes the first supply channel 110 in a normal state, for example, when the device 10 is turned on. After being turned on, the drive device 170 is turned on, so that the feeder device 150 is put in operation. As soon as the drive device 170 and/or the feeder device 150 has reached a predetermined operating state, such as, for example, a nominal rotational speed, a control mechanism of the control device 240 opens the closing device 250, so that the feeder device 150 feeds and, in particular, compresses the first reagent in the reaction chamber 20.

With the help of the dosing device 210, the second reagent is furthermore likewise dosed into the reaction chamber 20 after the drive device 170 and/or the feeder device 150 has reached a predetermined operating state, in particular, the same operating state that is used as a condition for opening the closing device 250. Under some circumstances, in this way, the time between the dosing of the second reagent and an initialization of a reaction in the reaction chamber 20 can be shortened.

After reaching a predetermined value of a state variable within the reaction chamber 20, preferably a predetermined pressure, a control mechanism of the control device 240 closes the closing device 250, so that the feeder device 150 is better protected under some circumstances from pressure waves and the like during a subsequent reaction in the reaction chamber 20. Reaching the predetermined value of the state variable in the reaction chamber 20 is detected by the state-determination means 280 and a corresponding signal is forwarded to the control device 240.

According to not-shown embodiments, the device has two or more than two control devices wherein each satisfies one or more of the described control tasks. Preferably, the two or more control devices are connected to each other, in order to communicate with each other.

The energy released by the reaction in the reaction chamber 20 is absorbed at least partially by means of the energy-receiving face 50 from the energy-transmission element 30 and is transmitted via the energy-discharge face to a fastener, after which the energy-transmission element 30 has moved toward the left in FIG. 1. The product or products, such as, for example, exhaust gases, produced during the reaction in the reaction chamber 20 and also in the expansion chamber 25 leave the expansion chamber 25 outward via a not-shown exhaust opening when the energy-transmission element 30 has moved toward the left in FIG. 1. The products remaining in the reaction chamber 20 and the expansion chamber 25 contract due to cooling taking place after the end of the reaction and draw the energy-transmission element 30 back into its starting position that is shown in FIG. 1.

It is advantageous when the feeder device 150 does not feed the first reagent into the reaction chamber 20 during this so-called thermal retraction of the energy-transmission element 30. Advantageously, a control mechanism of the control device 240 opens the closing device 250 only after reaching the starting position of the energy-transmission element 30. Reaching the starting position by the energy-transmission element 30 is detected by the position-determination means 270 and a corresponding signal is transmitted to the control device 240.

A preferred embodiment comprises a second supply channel for feeding a second reagent to the reaction chamber. In an especially preferred way, the second supply channel opens into the first supply channel upstream of the closing device viewed in the direction of flow of the first reagent. According to another especially preferred embodiment, the second supply channel opens into the first supply channel downstream of the closing device viewed in the direction of flow of the first reagent.

According to a not-shown embodiment, the second supply channel opens into the first supply channel. Preferably, the second supply channel opens into the first supply channel upstream of the closing device viewed in the flow of direction of the first reagent. According to another not-shown embodiment, the second supply channel opens into the closing device that then comprises, in particular, a three-way valve whose two inputs are connected to the feeder device and to the second supply channel, while the output of the three-way valve is connected to the reaction chamber. According to another not-shown embodiment, the second supply channel opens into the first supply channel downstream of the closing device viewed in the direction of flow of the first reagent.

The device 10 shown in FIG. 1 furthermore has a trigger switch 290 for, in particular, manual triggering of a fastening process, wherein this switch is connected to the control device 240. The trigger switch 290 preferably comprises a pull that can be activated, for example, with an index finger, while the device 10 is held with one or two hands and is pressed, in particular, onto the backing 90.

In addition, the device 10 has, in particular, an electrical energy storage device 300 that is constructed, for example, as a rechargeable battery or accumulator, in particular, and is connected to the control device 240, the feeder device 150, the drive device 170, the dosing device 210, and/or the closing device 250 for their energy supply.

The functioning of the described device concerns the idea of making available the largest possible quantity of reagents before a reaction in the reaction chamber. In the case of gaseous and/or fluid reagents, at the beginning and/or during the reaction the highest possible pressure should prevail in the reaction chamber. Charging the reaction chamber long before the beginning of the reaction is not advantageous under some circumstances, because a portion of the reagents could be lost due to leaks and the like or the pressure could drop. Furthermore, the charging should take place as quickly as possible, in order to guarantee the highest possible repetition rate of the fastening processes. The described device here allows a high volume flow for, in particular, a gaseous reagent.

In FIG. 2, another device 310 for transmitting energy to a fastener, for example, a nail, pin, bolt, or the like is shown schematically. Compared to the device 10 shown in FIG. 1, the device 310 also has a turbulence generator that is arranged in the reaction chamber 20 and that comprises, in the shown embodiment, a fan wheel 320 and also a rotating shaft 330, wherein the fan wheel 320 is connected locked in rotation, in particular, rigidly to the rotating shaft 330, in particular, it is fixed on the rotating shaft 330. The turbulence generator is used for generating turbulence within the reaction chamber 20, wherein, under some circumstances, the turbulence accelerates the rate of the reaction within the reaction chamber 20 and thus increases the energy that can be transmitted to a fastener.

Preferably, the rotating shaft 330 is oriented essentially in the fastening direction and/or in the direction of an axis of symmetry of the expansion chamber 25, so that mechanical loads of axle bearings and the like due to recoil occurring during a fastening process under some circumstances and/or other acceleration forces, such as, for example, gyrostatic moments, are reduced. In an especially preferred way, the rotating shaft 330 is arranged coaxial on the rotational axis of the rotor of the feeder device 150 and/or on the rotational axis of the drive device 170.

In the case of a not-shown embodiment, the turbulence generator comprises a plate that passes through the reaction chamber 20 and has one or more openings, wherein the reagent or reagents and also a reaction front can pass through these openings and in this way can generate turbulence. In the case of another not-shown embodiment, the turbulence generator comprises a plate that moves within the reaction chamber 20 and moves through the reaction chamber 20 during the reaction and in this way generates turbulence.

In FIG. 3, a feeder device 410 for feeding a fluid is shown in a cross-sectional view, wherein the fluid is, in particular, a gas and/or a liquid. Preferably, the feeder device 410 is used for feeding the first reagent into the device 10 according to FIG. 1 or into the device 310 according to FIG. 2.

The feeder device 410 has a rotor 420 having a rotational axis 430 and a stator 440. The rotor comprises a cylindrical outer wall 425 and also several vanes 435, 436, 437 that are arranged in radially shifted receptacles of the rotor not shown in detail, wherein, in the receptacles there are likewise not-shown spring elements that press the vanes 435, 436, 437 radially outward, so that the vanes are pressed at all times against the inner wall 450 of the stator 440. Thus, a gap between the inner wall 450 and the outer wall 425 is divided at all times into several pump chambers 490, 500, 510.

The stator 440 comprises a cylindrical inner wall 450 within which the rotor 420 is arranged eccentrically and so that it can rotate such that the inner wall 450 is opposite the outer wall 425 and touches or at least comes very close to a contact point 480. Due to the symmetrical outer shape of the rotor 420, the contact point 480 remains at the same location at all times. Furthermore, the feeder device has an inlet 460 and an outlet 470.

In a first operating mode of the feeder device 410, the rotor 420 rotates in the clockwise direction around the rotational axis 430 of the rotor, so that the pump chambers 490, 500, 510 rotate along the inner wall 450 in the clockwise direction. Starting from the inlet 460, the pump chambers 490, 500, 510 here initially increase in size, so that a low pressure is produced at the inlet 460, after which the pump chambers 490, 500, 510 become smaller again toward the outlet 470, so that a high pressure is produced at the outlet 470.

The invention was described with reference to examples of a device for transmitting energy to a fastener. The features of the described embodiments can also be combined here with each other in arbitrary ways within a single energy transmission device. It is noted that the device according to the invention is also suitable for other purposes.

The invention claimed is:

1. A device for transmitting energy to a fastener, comprising a reaction chamber, an energy-transmission element that can move to transmit energy released in the reaction chamber to a fastener, a first supply channel opening into the reaction chamber for feeding a first reagent to the reaction chamber, wherein the first supply channel comprises a feeder device for feeding the first reagent into the reaction chamber and for compressing the first reagent in the reaction chamber; a drive device for the feeder device, and a closing device for closing the first supply channel, wherein the closing device is arranged downstream of the feeder device and upstream of the reaction chamber, and wherein the closing device can be opened and closed, and a control device connected to the closing device for opening and closing the closing device according to specified conditions, wherein the control device is connected to the drive device for controlling the feeder device.

2. The device according to claim 1, wherein the reaction chamber has an initialization device arranged in the reaction chamber for initializing a reaction, wherein the initialization device is connected to the control device.

3. The device according to claim 2, wherein the control device comprises a control mechanism that triggers the initialization of a reaction in the reaction chamber by the initialization device under the condition that the closing device is closed.

4. The device according to claim 1, further comprising position-determination means for determining the position of the energy-transmission element, wherein the position-determination means are connected to the control device and wherein the control device comprises a control mechanism that triggers the opening of the closing device or the initialization of a reaction in the reaction chamber by means of the initialization device under the condition that the energy-transmission element is positioned in a starting position.

5. The device according to claim 1, further comprising state-determination means for determining a state variable in the reaction chamber, wherein the state-determination means are connected to the control device.

6. The device according to claim 5, wherein the control device comprises a control mechanism that triggers an opening or closing of the closing device or the initialization of a reaction in the reaction chamber by means of an initialization device under the condition that a state variable in the reaction chamber has reached or exceeded or fallen below a specified value.

7. The device according to claim 1, wherein the feeder and/or drive device is connected to the control device and wherein the control device comprises a control mechanism that triggers the opening of the closing device under the condition that the feeder device is in operation.

8. The device according to claim 1, wherein the feeder and/or drive device is connected to the control device, wherein the control device comprises a control mechanism that triggers a shutdown of the feeder or drive device under the condition that the feeder device has been in operation for a specified duration.

9. The device according to claim 1, further comprising a second supply channel for feeding a second reagent to the reaction chamber.

10. The device according to claim 9, wherein the second supply channel opens into the first supply channel upstream of the closing device viewed in the direction of flow of the first reagent.

11. The device according claim 9, wherein the second supply channel opens into the first supply channel downstream of the closing device viewed in the direction of flow of the first reagent.

12. The device according to claim 9, wherein the first supply channel and/or the second supply channel has an inlet opening for surrounding air.

13. The device according to claim 9, further comprising a receptacle for a reagent reservoir adjacent to the first supply channel and/or to the second supply channel.

14. The device according to claim 2, further comprising state-determination means for determining a state variable in the reaction chamber, wherein the state-determination means are connected to the control device.

15. The device according to claim 14, wherein the control device comprises a control mechanism that triggers an opening or closing of the closing device or the initialization of a reaction in the reaction chamber by means of the initialization device under the condition that a state variable in the reaction chamber has reached or exceeded or fallen below a specified value.

16. The device according to claim 3, further comprising position-determination means for determining the position of the energy-transmission element, wherein the position-determination means are connected to the control device and wherein the control device comprises a control mechanism that triggers the opening of the closing device or the initialization of a reaction in the reaction chamber by means of the initialization device under the condition that the energy-transmission element is positioned in a starting position.

17. The device according to claim 4, further comprising state-determination means for determining a state variable in the reaction chamber, wherein the state-determination means are connected to the control device.

18. The device according to claim 17, wherein the control device comprises a control mechanism that triggers an opening or closing of the closing device or the initialization of a reaction in the reaction chamber by means of the initialization device under the condition that a state variable in the reaction chamber has reached or exceeded or fallen below a specified value.

19. The device according to claim 1, wherein the closing device comprises a valve that can be activated hydraulically, pneumatically, electrically, electromotively, or electromagnetically.

* * * * *